Patented Oct. 4, 1932

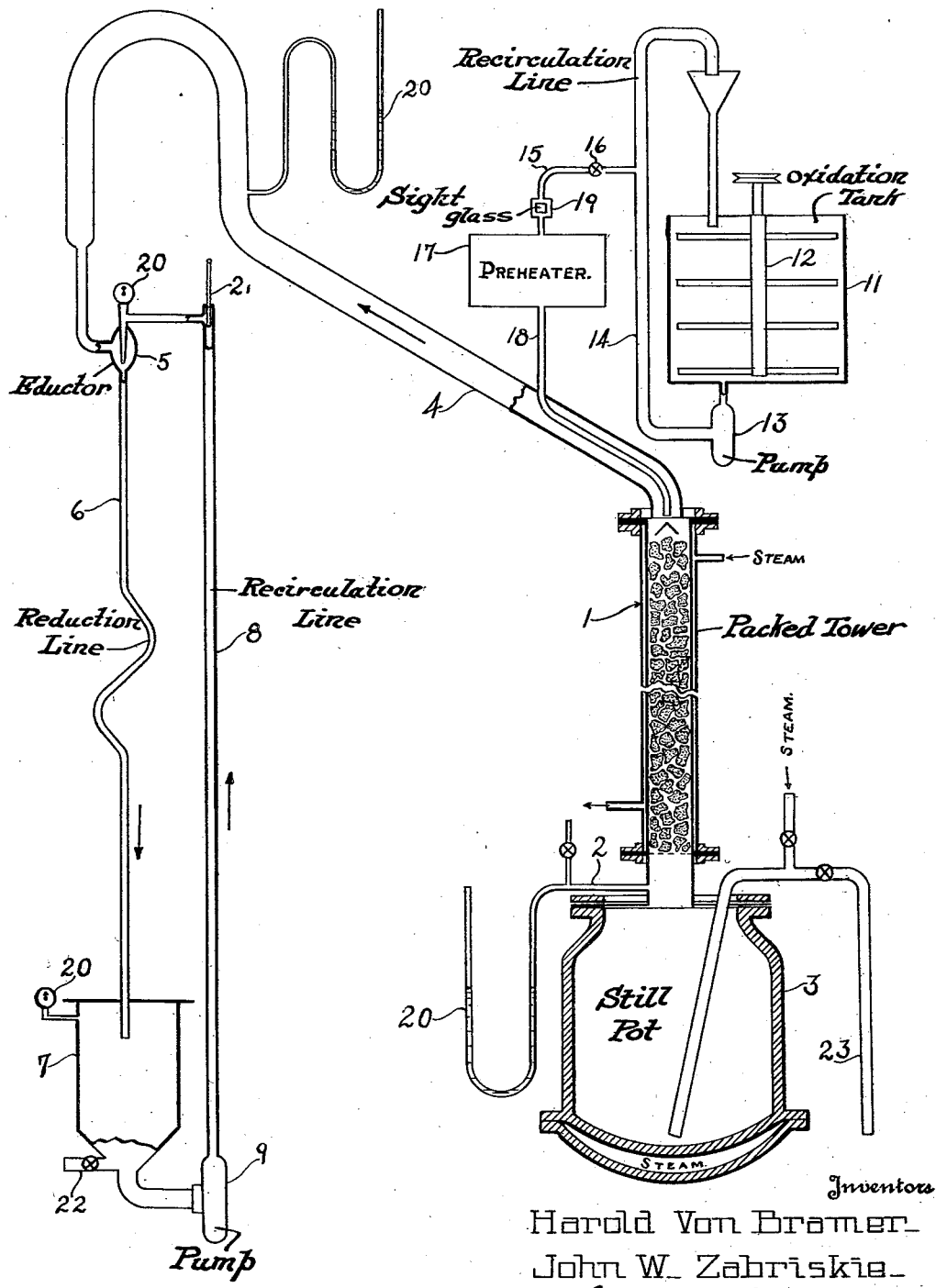

1,880,534

UNITED STATES PATENT OFFICE

HAROLD VON BRAMER AND JOHN W. ZABRISKIE, OF PASSAIC JUNCTION, NEW JERSEY, ASSIGNORS TO EASTMAN KODAK COMPANY, OF ROCHESTER, NEW YORK, A CORPORATION OF NEW YORK

PRODUCTION OF HYDROQUINONE

Application filed May 17, 1929. Serial No. 363,808.

This invention relates to the production of hydroquinone and more particularly to the separation of quinone resulting from the oxidation of aniline and the reduction of the quinone so produced to hydroquinone.

Heretofore, the method usually employed for the production of hydroquinone has been a two-batch method involving (1) the oxidation of aniline to quinone by the use of manganese dioxide or sodium dichromate and sulfuric acid of various concentrations and (2) the reduction of the quinone by the addition of iron or zinc dust to the quinone reaction mixture (still bearing an excess of acid) for the reduction of the quinone to hydroquinone. The solution of hydroquinone thus produced then was required to be filtered and extracted by the use of a suitable solvent, such as ether. The hydroquinone then was crystalized in a well known manner requiring a multiplicity of steps. It was found by us, by actual practice, that the employment of the above method was tedious and time consuming, requiring approximately seven days to complete all steps thereof; we also found that it was impossible to obtain thereby more than approximately an 80% yield.

We have discovered that following the oxidation of the aniline to quinone, the quinone can be vaporized from the reaction mixture by the employment of steam distillation, not in the manner which would ordinarily be expected, namely, by blowing the steam through the reaction mixture, but by steam distilling the quinone from the reaction mixture in a tower subject to the conditions hereinafter set forth. While in the vapor state the quinone and steam are conducted immediately to an eductor which intimately mixes the quinone vapor with a recirculated current of water and suspended iron dust, thereby reducing the quinone to hydroquinone.

Various attempts have been made in the past to separate quinone from the reaction mixture by steam distillation but all, so far as our information goes, have been unsuccessful for the reason that the instant that quinone in solution is subjected to steam distillation it quite readily decomposes into undesirable elements. This has resulted in the practice heretofore of conducting the reducing reaction in the same reaction mixture as that in which the quinone was formed.

Rather opposed to the conclusions of those who have previously worked with these materials, we find that if the reaction mixture containing quinone is very rapidly preheated to the temperature of low pressure steam, the quinone can be vaporized from the reaction mixture by the use of steam without the decomposition of the quinone. As a further condition to our method of steam distillation, we also have found it quite desirable to spray or otherwise diffuse the quinone reaction mixture into a tower containing coke or other suitable material for physically breaking up the quinone reaction mixture so as to obtain a rapid and intimate contact between the steam and the reaction mixture for the vaporization of the quinone therefrom.

As a further step in our invention, we then conduct the mixture of quinone and steam vapor, without exposure to air, to the eductor above referred to. This eduction apparatus includes means for continually recirculating a suspension of iron dust in water through an eductor nozzle which, by virtue of its aspirator effect, sucks into the stream of water and iron dust the quinone and steam vapors. By such an arrangement, a very intimate contact of the quinone with the iron dust in water is obtained so that practically an immediate reaction takes place by which the quinone is reduced to hydroquinone. To insure completion of the reaction, the quinone vapors (if any there be, which pass the eductor nozzle without being completely reacted) are permitted to travel through a pipe of some length through which the water and iron dust are being circulated in order that completion of the reaction may be assured. By this recirculation of the water, substantially a saturated solution of hydroquinone is obtained by the time the entire batch of quinone is reacted upon. The vat temperature of the hydroquinone solution is maintained at approximately 95° to 97° C., although due to the eduction of steam into the recirculation stream, the temperature at which the reduction reaction is permitted to take place is substantially 100° C.

When all of the quinone has been reduced to hydroquinone, all that remains to be done is to filter the solution of hydroquinone so as to remove the iron products therein and allow the hydroquinone to crystallize from the solution, thereafter drying the crystals in a well known manner. We have found that by our improved method we have been able to obtain a product with a purity as high as 95% or even greater, and that the process may be carried out in approximately half the time employed in carrying out the old process with a corresponding saving in labor and equipment. We have also found that yields have been of such efficiency that 1000 pounds of aniline (technical) will yield approximately 1000 pounds of hydroquinone of the purity above referred to.

The equipment employed by us in carrying out our improved process is of the same general nature as that employed in chemical plant operations involving similar steps. The particular set-up employed by us is depicted in the accompanying drawing constituting a part hereof and in which is illustrated a steam jacketed tower 1, packed with coke or other suitable packing which has a test outlet 2 and is mounted upon and in communication with a still or kettle 3 which is provided with both direct and indirect steam. A short pipe 4 leads from the top of the tower 1 to the eductor 5. A small vertical line 6 connects the eductor with the tank 7 which is provided with a return or recirculation line 8 having a pump 9 in series therewith to provide for the recirculation of the water and iron dust mixture through the eductor 5. The oxidation of the aniline to quinone may be conducted in the vat or tank 11 in which the reaction mixture containing the quinone is continually agitated by means of the stirrer 12. A pump 13 and recirculation line 14 are also provided for recirculating the quinone reaction mixture, the line 14 being provided with a take-off line 15 controlled by a valve 16 which permits a constant flow of the quinone reaction mixture to pass into the preheater 17. It will be noted that the line 4 is sloping and that the quinone reaction mixture, upon leaving the preheater 17, enters the tower 1 through a line 18 partially surrounded by the pipe 4 and of such a length as to require only a short flow to the tower 1. Sight glasses, such as 19, pressure gauges, such as 20, thermometers, such as 21, and outlets, such as 22, may be provided where necessary as is well known. The line 23 may be used for emptying the still 3 by suction.

Assuming that the tank 11 contains a batch of the quinone reaction mixture, the recirculation of this mixture is started through the line 14 by means of the pump 13. The recirculation of the suspension of iron dust in water in the tank 7 is also commenced through the line 8, the eductor 5 and the line 6. Steam is then blown through the various lines provided for that purpose, the direct steam injected into the still 3 rising through the tower 1, the line 4 and the eductor 5, so that all portions of the equipment are brought up to the approximate working temperature desired. A small but steady stream of the quinone reaction mixture is then withdrawn from the line 14 and forced through the preheater 17 wherein it is rapidly brought to a temperature of approximately 100° C. and is permitted to flow through the line 18 into the tower 1 wherein it trickles down over the coke packing for its intimate contact with the steam rising through the tower 1, line 4, etc. The tower 1 may be from 8 to 10 ft. in height to permit complete vaporization of the quinone from the reaction mixture. When the residual quinone reaction mixture reaches the bottom of the tower 1, it is continually volatilized by the direct and indirect steam applied thereto thereby generating further steam to assist the process. It is not necessary that any of the sulfuric acid contained in the quinone reaction mixture be carried over into the line 6 although a certain portion of this sulfuric acid may pass over as vapor and mingle with the quinone and steam vapor to assist in the reduction reaction which takes place at the eductor 5 and in the line 6. When the reduction of the quinone is complete and the reaction mixture contained in the tank 7 is more or less saturated with hydroquinone, the solution may be withdrawn from the tank 7 through the line 22 and thence conducted to the filtration and crystallization steps which are carried out in a well known manner.

Although we do not wish to limit ourselves by any specific examples of the constituents employed in producing the reactions above referred to (as these are all well known to those skilled in the art) it may be noted that in the production of the quinone, we may employ, in parts by weight, approximately 37 parts of manganese dioxide, 64 parts of 93% sulfuric acid, 13 parts of technical aniline, and 224 parts of water, which mixture may be thoroughly stirred for a 20 hour reaction time at a temperature which may be maintained at 0° to 5° C. With this quinone reaction mixture we have found that approximately 10 parts of iron dust should be employed, which is, of course, an excess thereof to insure complete reduction of the quinone. This amount of iron dust may be conveniently suspended in approximately 80 parts of water which is sufficient to completely dissolve all the hydroquinone formed without having too great an excess of water to hamper the crystallization step. We may also employ, in parts by weight, approximately 75 parts of sodium dichromate, 200 parts of sulfuric acid, 25 parts of aniline and 900 parts of water. With these materials and proportions, approximately 20 parts of iron dust and 160 parts of water may be employed in reducing the quinone.

It will be noted, therefore, that our invention actually constitutes the combination of two steps which themselves are separately new, namely, on the one hand we have discovered that quinone may be steam distilled from its reaction mixture, and on the other hand that by the intermingling of quinone in the vapor state (either with or without an acid radical) with a suspension of iron dust in water, a rapid and substantially complete reduction of the quinone will take place. When these two steps are combined, as heretofore indicated, a novel method for the production of hydroquinone results which is continuous insofar as each charge or batch of the quinone reaction mixture is concerned.

Obviously, various equivalents in the nature of equipment might be employed to carry out the spirit as well as the letter of our invention. For instance, various forms of towers might be employed for obtaining an intimate contact of the steam with the quinone reaction mixture, and equipment other than an eductor might be employed for obtaining an intimate contact between the quinone vapor and the iron dust. Also, in the event that it is not desired to obtain as saturated a solution of the final product as is hereinbefore indicated, the stream with which the vapors are intermingled may be conducted directly to the filtration and crystallization steps without recirculation thereof. It is, therefore, intended that all equivalents to which we might resort in the way of means for carrying out our invention shall, when carrying out our invention or the steps thereof, be considered to come within the scope of the claims appended hereto.

What we claim as our invention and desire to be secured by Letters Patent, is:

1. The process of producing hydroquinone which comprises vaporizing quinone from a solution containing it and intermingling the quinone vapors with a stream of water having iron dust suspended therein.

2. The process of producing hydroquinone which comprises vaporizing quinone from a reaction mixture containing it and intermingling the quinone vapors with a stream of water having iron dust suspended therein.

3. The process of producing hydroquinone which comprises vaporizing quinone from a reaction mixture containing it and intermingling the quinone vapors with a re-circulated stream of water having iron dust suspended therein.

4. The process of producing hydroquinone which comprises vaporizing quinone from a solution containing it by passing the said solution countercurrent to a current of steam and intermingling the quinone and steam vapors with a stream of water having iron dust suspended therein.

5. The process of producing hydroquinone which comprises vaporizing quinone from a solution containing it by passing the said solution countercurrent to a current of steam and intermingling the quinone and steam vapors with a re-circulated stream of water having iron dust suspended therein.

6. The process of producing hydroquinone which comprises vaporizing quinone from a solution containing it by means of a current of steam and thereupon without exposure to an oxidizing atmosphere interminging the quinone and steam vapors with a re-circulated stream of water having iron dust suspended therein.

7. The process of producing hydroquinone which comprises vaporizing quinone from a solution containing it by rapidly preheating the said solution to approximately 100° C. passing the said solution countercurrent to a current of steam and intermingling the quinone and steam vapors with a stream of water having iron dust suspended therein.

8. The process of producing hydroquinone which comprises vaporizing quinone from a solution containing it by rapidly preheating the said solution to approximately 100° C., passing the said solution countercurrent to a current of steam and intermingling the quinone and steam vapors with a re-circulated stream of water having iron dust suspended therein.

9. The process of producing hydroquinone which comprises intermingling quinone vapors with water which has iron dust suspended therein.

10. The process of producing hydroquinone which comprises intermingling quinone vapors with a stream of water which has iron dust suspended therein.

11. The process of producing hydroquinone which comprises intermingling quinone vapors with a re-circulated stream of water which has iron dust suspended therein.

12. A process of producing hydroquinone which comprises vaporizing quinone from a solution containing it in an atmosphere free from reactive gases and thereupon intermingling the quinone vapors with a reducing agent.

13. A process of producing hydroquinone which comprises vaporizing quinone from a reaction mixture containing it in an atmosphere free from reactive gases and thereupon intermingling the quinone vapors with a re-circulated stream of reducing material.

14. A process of producing hydroquinone which comprises vaporizing quinone from a solution containing it by passing the said solution counter-current to a current of steam and thereupon intermingling the quinone and steam vapors with a reducing agent.

15. The process of producing hydroquinone which comprises vaporizing quinone in an atmosphere free from reacting gases and thereupon intermingling the quinone vapors with a reducing agent.

Signed at Passaic Junction, N. J., this 13th day of May 1929.

HAROLD VON BRAMER.
JOHN W. ZABRISKIE.